(12) United States Patent
Li et al.

(10) Patent No.: US 11,469,019 B2
(45) Date of Patent: Oct. 11, 2022

(54) INTEGRATED MAGNETIC DEVICE

(71) Applicant: Murata Manufacturing Co., Ltd., Nagaokakyo (JP)

(72) Inventors: Gang Li, Hubei (CN); Long Ning, Hubei (CN)

(73) Assignee: MURATA MANUFACTURING CO., LTD., Kyoto (JP)

( * ) Notice: Subject to any disclaimer, the term of this patent is extended or adjusted under 35 U.S.C. 154(b) by 417 days.

(21) Appl. No.: 16/826,773

(22) Filed: Mar. 23, 2020

(65) Prior Publication Data

US 2020/0312505 A1  Oct. 1, 2020

(30) Foreign Application Priority Data

Mar. 28, 2019  (CN) .......................... 201910244004.7

(51) Int. Cl.
| H01F 3/14 | (2006.01) |
| H01F 27/30 | (2006.01) |
| H01F 27/40 | (2006.01) |
| H01F 27/38 | (2006.01) |
| H02M 3/07 | (2006.01) |

(52) U.S. Cl.
CPC ............. *H01F 3/14* (2013.01); *H01F 27/306* (2013.01); *H01F 27/38* (2013.01); *H01F 27/40* (2013.01); *H02M 3/07* (2013.01)

(58) Field of Classification Search
CPC .......... H01F 3/14; H01F 27/306; H01F 27/38; H01F 27/40; H02M 3/07
See application file for complete search history.

(56) References Cited

U.S. PATENT DOCUMENTS

| 2009/0128277 | A1* | 5/2009 | Moiseev | H01F 30/06 336/170 |
| 2009/0237197 | A1* | 9/2009 | Ikriannikov | H01F 27/24 336/212 |
| 2009/0278648 | A1* | 11/2009 | Teng | H01F 27/2866 336/199 |
| 2009/0289751 | A1* | 11/2009 | Nagano | H02M 3/1584 336/221 |
| 2013/0033351 | A1* | 2/2013 | Kim | H01F 27/38 336/170 |

(Continued)

FOREIGN PATENT DOCUMENTS

CN  207819762 U  9/2018

*Primary Examiner* — Rafael O De Leon Domenech
(74) *Attorney, Agent, or Firm* — Keating & Bennett, LLP

(57) ABSTRACT

An IM device includes a magnetic core including a base plate, a cover plate, and first, second and third magnetic columns. A straight line defined by positions of the first and second magnetic columns is parallel to a length direction, and the third magnetic column is between the first and second magnetic columns, and extends in a width direction. A first coil is wound around the first magnetic column to generate a closed magnetic flux loop, a second coil wound around the second magnetic column to generate a closed magnetic flux loop. The magnetic core includes a fourth magnetic column between the base plate and the cover plate, and close to a first terminal of the third magnetic column in the width direction. In the length direction, the fourth magnetic column overlaps with at least a portion of the first magnetic column and at least a portion of the second magnetic column.

20 Claims, 16 Drawing Sheets

(56) References Cited

U.S. PATENT DOCUMENTS

| | | | |
|---|---|---|---|
| 2014/0016368 A1* | 1/2014 | Chandrasekaran ... | H02M 3/285 336/192 |
| 2014/0016369 A1* | 1/2014 | Chandrasekaran ..... | H01F 27/38 336/170 |
| 2016/0254756 A1* | 9/2016 | Yang ....................... | H01F 30/12 363/21.02 |
| 2017/0287615 A1* | 10/2017 | Lu ........................ | H01F 27/2823 |

* cited by examiner

INTEGRATED MAGNETIC DEVICE

CROSS REFERENCE TO RELATED APPLICATIONS

This application claims the benefit of priority to Chinese Patent Application No. 201910244004.7 filed on Mar. 28, 2019. The entire contents of this application are hereby incorporated herein by reference.

BACKGROUND OF THE INVENTION

1. Field of the Invention

The present invention relates to an integrated magnetic technology field, and more particularly, to an Integrated Magnetic (IM) device.

2. Description of the Related Art

For miniaturized appliances, their internal components should occupy a small space and have a low weight as much as possible.

Taking an unmanned aerial vehicle (UAV) as an example, there are strict requirements on the size and weight of a power supply used in the UAV due to restrictions on an overall size and weight of the UAV.

For a power supply, magnets (including magnetic cores and coils wound around the magnetic cores) such as converters are a crucial factor affecting the size, weight and efficiency of the power supply.

To obtain a converter with higher efficiency and a smaller size, integrated-magnetic-technology that integrates a transformer and an output inductor of a current doubler rectifier has been proposed in existing techniques. For example, Chinese patent application CN201820065376.4 discloses specific implementation of IM technology and a technical solution of using an E-I type magnetic core to reduce a size of a magnet.

Specifically, referring to FIG. 1, Chinese patent application CN201820065376.4 discloses an IM device 20 having an E-I type magnetic core (which may be referred to as a magnetic body or a magnet). The E-type magnetic core refers to a magnetic body composed of three longitudinal magnetic columns 201, 202, and 203 and a lateral magnetic column 204 in FIG. 1, and the I-type magnetic core refers to a magnetic body defining and functioning as a cover plate disposed above the E-type magnetic core in an angle shown in FIG. 1.

Further, in the IM device 20, a first inductor L1 (not shown) and a second inductor L2 (not shown) are wound around outer magnetic columns (i.e., the magnetic column 201 and the magnetic column 203) of the E-type magnetic core. As magnetic flux generated by a current in the first and second inductors L1 and L2 can be cancelled on the middle magnetic column (i.e., the magnetic column 202), actual magnetic flux of the middle magnetic column 202 is reduced. Therefore, referring to FIG. 2, a cross-sectional area of the middle magnetic column 202 is reduced accordingly. Therefore, a size of the IM device 20 is reduced accordingly.

However, with the technical solution described in Chinese patent application CN201820065376.4, the thickness of the E-type magnetic core (that is, height h of the magnetic column) is large, resulting in a relatively large overall size and high manufacturing cost of the IM device 20.

Specifically, taking a closed magnetic flux loop provided by the middle magnetic column 202 and the outer magnetic column 201 as an example, a flow path s1 of magnetic flux $\Phi$ in the existing E-type magnetic core is shown by an arrow in FIG. 3, that is, starting from the outer magnetic column 201, passing through the middle magnetic column 202, and then returning to the outer magnetic column 201. This requires that areas of each cross section on the flow path s1 must be sufficiently large (at least larger than a minimum magnetic flux area) to prevent magnetic saturation.

Referring to FIG. 3, the cross sections on the flow path s1 include a cross section A (an area indicated by dots in FIG. 3) of the outer magnetic column 201 along the x and y directions, and a cross section B (an area indicated by diagonal lines in FIG. 3) of the lateral magnetic column 204 along the y and z directions.

To meet the requirement of the minimum magnetic flux area, an area of the cross section B cannot be too small, and thus the height h of the lateral magnetic column 204 cannot be too small. As a result, the entire IM device cannot be further miniaturized. Accordingly, manufacturing cost of the IM device 20 cannot be further reduced.

Therefore, the existing solutions cannot provide an IM device with a smaller size and lower manufacturing cost.

SUMMARY OF THE INVENTION

Preferred embodiments of the present invention provide IM devices each having a relatively small size.

In a preferred embodiment of the present invention, an integrated-magnetic (IM) device includes a magnetic core, wherein the magnetic core includes a base plate, a cover plate, a first magnetic column, a second magnetic column, and a third magnetic column disposed between the base plate and the cover plate, the magnetic core has a length direction, a width direction, and a height direction which are perpendicular or substantially perpendicular to each other, a straight line defined by positions of the first magnetic column and the second magnetic column is parallel or substantially parallel to the length direction, and the third magnetic column is disposed between the first magnetic column and the second magnetic column, and extends in the width direction; a first coil wound around the first magnetic column to generate a closed magnetic flux loop; a second coil wound around the second magnetic column to generate a closed magnetic flux loop; wherein the magnetic core further includes a fourth magnetic column, wherein the fourth magnetic column is disposed between the base plate and the cover plate, and close to a first terminal of the third magnetic column in the width direction, and in the length direction, the fourth magnetic column overlaps with at least a portion of the first magnetic column and at least a portion of the second magnetic column.

With the above preferred embodiment, a size of the IM device, particularly a thickness of the magnetic core, is able to be reduced. Specifically, the fourth magnetic column increases a flow path of magnetic flux, which makes it possible to enlarge a cross section of the magnetic core through which the magnetic flux passes, thus effectively increasing saturated magnetic flux. Further, the enlargement in the cross section of the magnetic core through which the magnetic flux passes makes it possible to reduce the thickness of the magnetic core, thus reducing the size of the IM device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
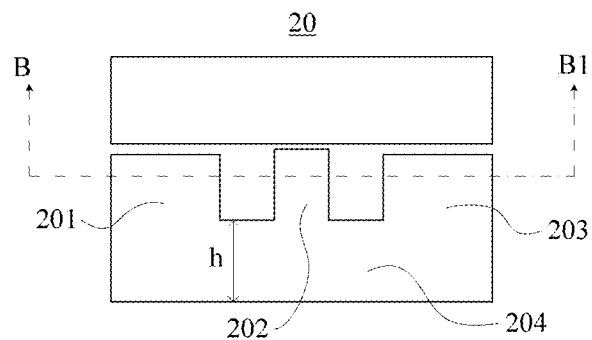
FIG. 1 schematically illustrates a side view of an IM device of the related art.
Figure 2:
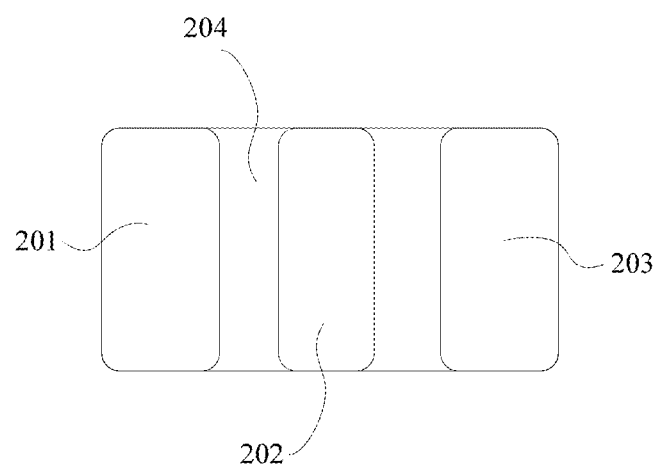
FIG. 2 schematically illustrates a sectional view of the IM device as shown in FIG. 1 along a BB1 line.
Figure 3:
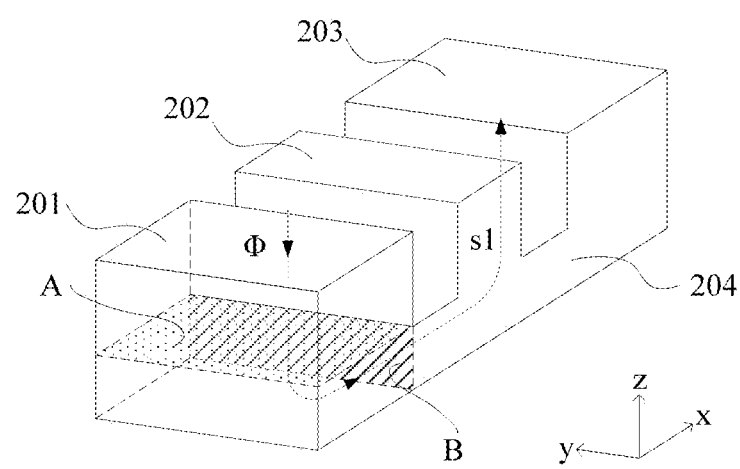
FIG. 3 schematically illustrates a stereogram of the IM device as shown in FIG. 2.

Preferred embodiments of the present invention provide integrated-magnetic (IM) devices. In the following preferred embodiments, IM devices are preferably applied in a dual buck circuit, for example. However, the present invention is not limited thereto. The IM devices may be applied in other types of buck circuits.

Hereinafter, preferred embodiments of the present invention will be described in detail with reference to drawings. The same or substantially the same portions and elements are denoted by the same reference numerals. The preferred embodiments described below are merely examples, and the structures shown in different preferred embodiments may be partially replaced or combined. Description of common features among different preferred embodiments are omitted, and merely differences are described. In particular, the same or similar advantageous effects produced by the same or similar structures are not described one by one in each preferred embodiment.

In order to clarify features and advantages of preferred embodiments of the present invention, preferred embodiments of the present invention will be described clearly in detail in conjunction with the accompanying drawings.

Figure 4:
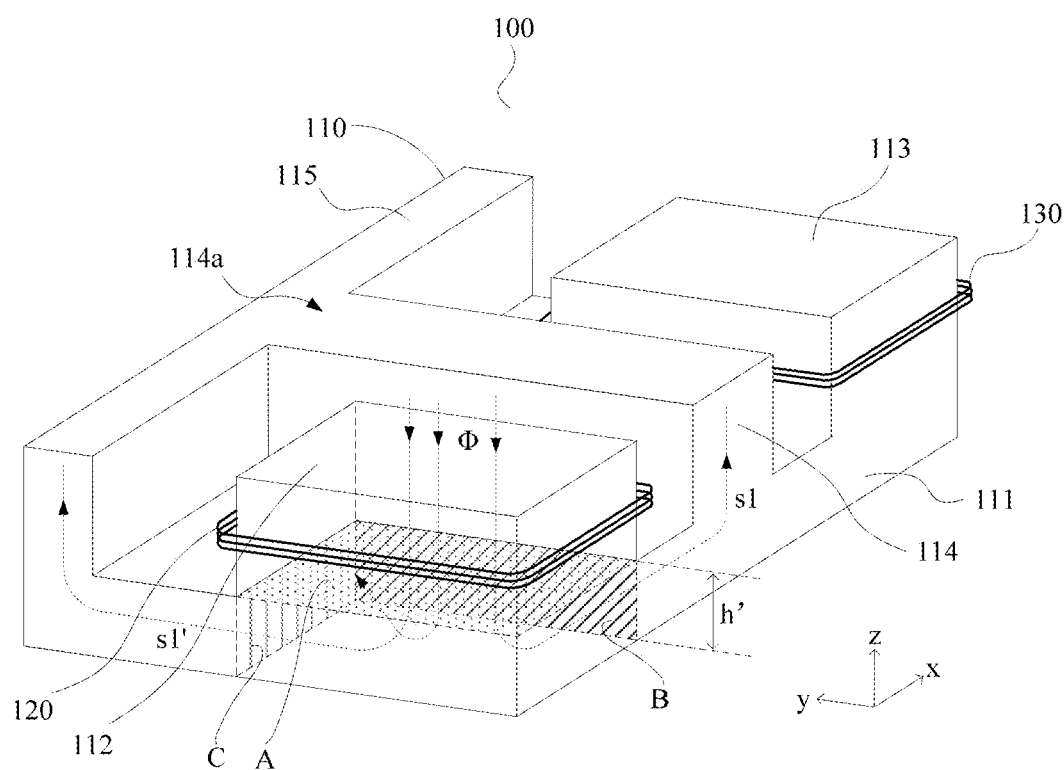
FIG. 4 schematically illustrates a stereogram of an IM device according to a preferred embodiment of the present invention.
Figure 5:
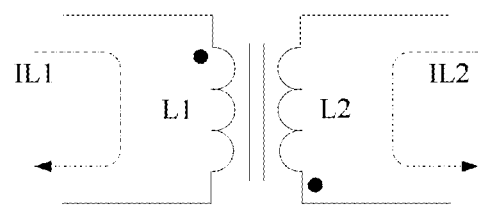
FIG. 5 schematically illustrates an equivalent circuit of the IM device as shown in FIG. 4.
Figure 6:
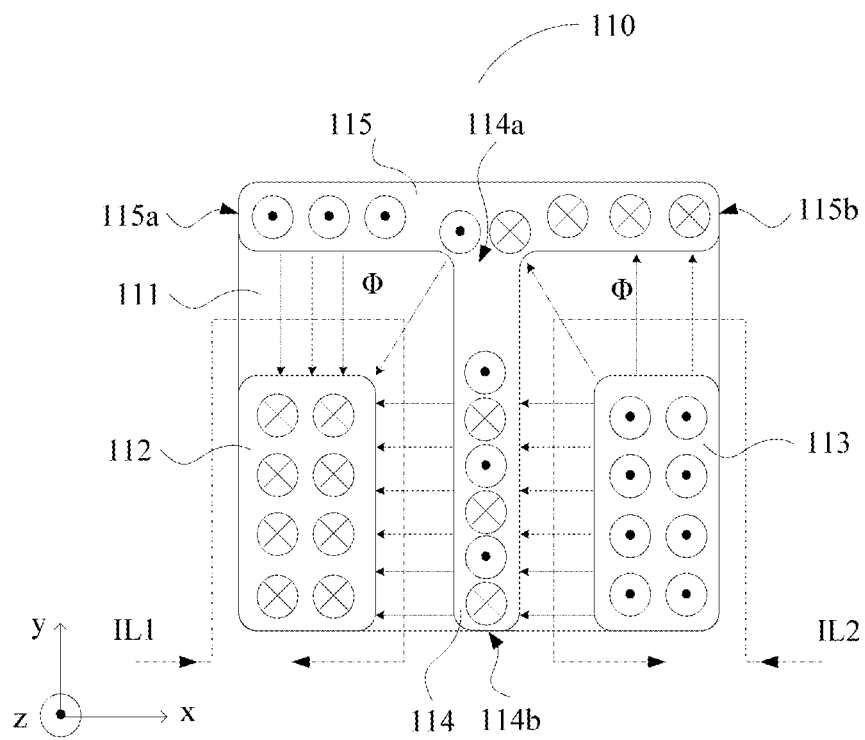
FIG. 6 schematically illustrates a top view of the IM device as shown in FIG. 4.
Figure 7:
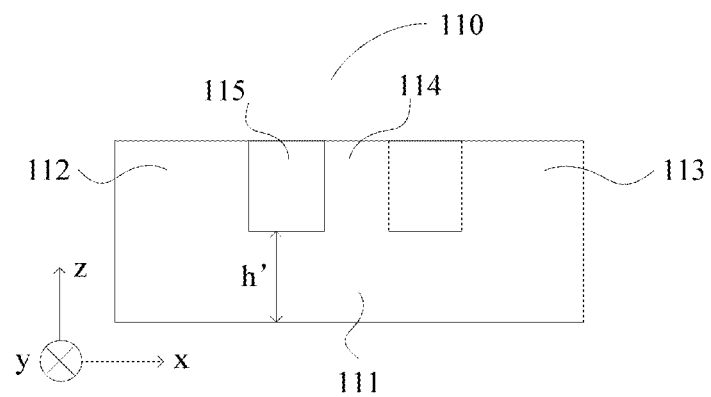
FIG. 7 schematically illustrates a front view of the IM device as shown in FIG. 4.
Figure 8:
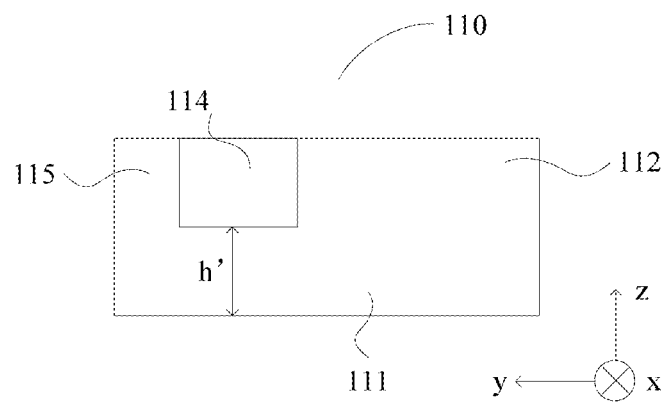
FIG. 8 schematically illustrates a side view of the IM device as shown in FIG. 4.

FIG. 4 schematically illustrates a stereogram of an IM device 100 according to a preferred embodiment of the present invention, FIG. 5 schematically illustrates an equivalent circuit of the IM device 100 as shown in FIG. 4, FIG. 6 schematically illustrates a top view of the IM device 100 as shown in FIG. 4, FIG. 7 schematically illustrates a front view of the IM device 100 as shown in FIG. 4, FIG. 8 schematically illustrates a side view of the IM device 100 as shown in FIG. 4. For the sake of simplicity, a cover plate is not shown in FIGS. 4 and 6 to 8.

Referring to FIGS. 4 and 5, the IM device 100 includes a magnetic core 110, a first coil 120, and a second coil 130.

It should be noted that FIG. 4 merely shows an example of the first coil 120 and the second coil 130. In practical applications, those skilled in the art may adjust coil turns and winding density of the first coil 120 and the second coil 130 as required.

The first coil 120 shown in FIG. 4 is equivalent to a wire of a first inductor L1 shown in FIG. 5, and the second coil 130 shown in FIG. 4 is equivalent to a wire of a second inductor L2 shown in FIG. 5. Dashed-dotted arrows in FIG. 5 indicate current directions of the wires of the first inductor L1 and the second inductor L2.

Further, due to the action of the magnetic core 110, there may be magnetic coupling between the first inductor L1 and the second inductor L2, and magnetic fields generated by the first inductor L1 and the second inductor L2 can be partially cancelled.

Further, referring to FIGS. 4 and 6 to 8, the magnetic core 110 may include, for example, a base plate 111, a cover plate (not shown), a first magnetic column 112, a second magnetic column 113, and a third magnetic column 114 disposed between the base plate 111 and the cover plate. The magnetic core 110 has a length direction (corresponding to the x direction shown in the figures), a width direction (corresponding to the y direction shown in the figures) and a height direction (corresponding to the z direction shown in the figures) which are perpendicular or substantially perpendicular to each other. A straight line defined by positions of the first magnetic column 112 and the second magnetic column 113 is parallel or substantially parallel to the length direction (i.e., the x direction), and the third magnetic column 114 is disposed between the first magnetic column 112 and the second magnetic column 113, and extends in the width direction (i.e., the y direction).

Further, the first coil 120 and the second coil 130 may, for example, be wound around two outer magnetic columns among the first magnetic column 112, the second magnetic column 113, and the third magnetic column 114 which are arranged side by side in the x direction, respectively. For example, taking the arrangement of the magnetic columns shown in FIG. 4 as an example, the first coil 120 may be wound around the first magnetic column 112 to generate a closed magnetic flux loop, and the second coil 130 may be wound around the second magnetic column 113 to generate a closed magnetic flux loop.

When polarities of voltages applied to input terminals of the first inductor L1 and the second inductor L2 are the same and polarities of voltages applied to output terminals of the first inductor L1 and the second inductor L2 are the same, wires of the first inductor L1 and the second inductor L2, i.e., the first coil 120 and the second coil 130, are respectively wound around the first magnetic column 112 and the second magnetic column 113 in opposite directions. Therefore, an AC magnetic field generated by the first inductor L1 and the second inductor L2 can be partially cancelled on the third magnetic column 114, thus reducing core loss of the third magnetic column 114. At any time, a DC magnetic field generated by the first inductor L1 and the second inductor L2 can be partially cancelled on the third magnetic column 114.

When polarities of voltages applied to input terminals of the first inductor L1 and the second inductor L2 are different and polarities of voltages applied to output terminals of the first inductor L1 and the second inductor L2 are different, the wires of the first inductor L1 and the second inductor L2, i.e., the first coil 120 and the second coil 130 are respectively wound around the first magnetic column 112 and the second magnetic column 113 in the same direction. Therefore, an AC magnetic field generated by the first inductor L1 and the second inductor L2 can be partially cancelled on the third magnetic column 114, thus reducing the core loss of the third magnetic column 114. At any time, a DC magnetic field generated by the first inductor L1 and the second inductor L2 can be partially cancelled on the third magnetic column 114.

As the magnetic field generated by a current in the first and second inductors L1 and L2 can be cancelled on the third magnetic column 114, a magnetic flux of the third magnetic column 114 decreases, and thus, as shown in FIG. 6, an area of a cross section of the third magnetic column 114 along the x direction and the y direction is reduced accordingly. Specifically, the area of the cross section of the third magnetic column 114 along the x direction and the y direction is smaller than an area of a cross section of the first magnetic column 112 along the x direction and the y direction and/or an area of a cross section of the second magnetic column 113 along the x direction and the y direction.

Still referring to FIGS. 4 and 6 to 8, in the present preferred embodiment, the magnetic core 110 may further include a fourth magnetic column 115 disposed between the base plate 111 and the cover plate, and close to a first terminal 114a of the third magnetic column 114 in the width direction (i.e., the y direction). In the length direction (i.e., the x direction), the fourth magnetic column 115 overlaps with at least a portion of the first magnetic column 112 and at least a portion of the second magnetic column 113.

Therefore, the third magnetic column 114 is extended in the y direction and the fourth magnetic column 115 is extended in the x direction to define a T shape in a top view, which may enlarge a cross section of the core through which a magnetic flux Φ passes, thus improving a saturated magnetic flux.

Specifically, taking a closed magnetic flux loop generated by the first coil 120 at the third magnetic column 114 and the first magnetic column 112 as an example, a flow path of the magnetic flux Φ is shown in FIG. 4. The flow path may include a flow path s1 and a flow path s1'. In the flow path s1, the magnetic flux Φ starts from the first magnetic column 112, and a portion of the magnetic flux Φ passes through the third magnetic column 114 and returns to the first magnetic column 112. In the flow path s1', the magnetic flux Φ starts from the first magnetic column 112, and another portion of the magnetic flux Φ passes through the fourth magnetic column 115 and returns to the first magnetic column 112.

In other words, cross sections on the flow paths may include: a cross section A of the first magnetic column 112 along the x direction and the y direction (an area indicated by dots in FIG. 4), a cross section B of a first portion of the base plate 111 along the y direction and the z direction (an area indicated by diagonal lines in FIG. 4), and a cross section C of a second portion of the base plate 111 along the x direction and the z direction (an area indicated by vertical lines in FIG. 4). The first portion of the base plate 111 is disposed below the first magnetic column 112 and overlapping with the third magnetic column 114 in the y direction, and the second portion of the base plate 111 is disposed below the first magnetic column 112 and overlapping with the fourth magnetic column 115 in the x direction.

In some preferred embodiments, a sum of an area of the cross section B and an area of the cross section C is preferably smaller than an area of the cross section A.

Therefore, in the present preferred embodiment, the fourth magnetic column 115 is provided to shunt a portion of the magnetic flux Φ flowing from the first magnetic column 112 and the second magnetic column 113. When the sum of the area of the cross section B and the area of the cross section C is not smaller than a minimum magnetic flux area, it is ensured that the IM device 100 does not reach magnetic saturation, so that it is possible to reduce the height h' of the base plate 111 in the z direction. In other words, in the present preferred embodiment, the fourth magnetic column 115 is provided to define the cross section C through which the magnetic flux Φ passes, and the area of the cross section C may compensate for a reduction in the area of the cross section B caused by the decrease in the height h'.

Further, as the height h' of the base plate 111 in the z direction is reduced, the size of the IM device 100 may also be reduced accordingly, thus reducing manufacturing cost.

Further, as the size of the IM device 100 is reduced, a size of a power supply product may be reduced, and power density of the power supply product may be improved.

Further, still referring to FIG. 6, an extension direction of the fourth magnetic column 115 may preferably be parallel or substantially parallel to the length direction (i.e., the x direction) to reduce core loss on the fourth magnetic column 115.

Further, in the present preferred embodiment, the fourth magnetic column 115 may be a single-segment column, for example. That is, the fourth magnetic column 115 may continuously extend in the x direction to at least partially overlap with the first magnetic column 112 and the second magnetic column 113.

Further, referring to FIG. 6, in a top view, the fourth magnetic column 115 includes a first terminal 115a and a second terminal 115b opposite to each other in the x direction. In some preferred embodiments, in the x direction, the first terminal 115a of the fourth magnetic column 115 is preferably flush with a side of the first magnetic column 112 away from the third magnetic column 114. Similarly, in the x direction, the second terminal 115b of the fourth magnetic column 115 is preferably flush with a side of the second magnetic column 113 away from the third magnetic column 114. In this way, it is ensured that the length of the cross section C in the x direction is as large as possible, so that the height h' of the base plate 111 can be as small as possible.

Further, referring to FIGS. 4 and 6 to 8, in the width direction (i.e., the y direction), a gap may preferably exist between the fourth magnetic column 115 and the first magnetic column 112, and between the fourth magnetic column 115 and the second magnetic column 113, so that the magnetic flux Φ generates a closed magnetic flux loop between the first magnetic column 112 and the fourth magnetic column 115, and between the second magnetic column 113 and the fourth magnetic column 115.

Further, in some preferred embodiments, in the y direction, the first terminal 114a of the third magnetic column 114 may preferably be connected to or abut the fourth magnetic column 115. For example, the third magnetic column 114 and the fourth magnetic column 115 may be integrally provided. When the extension direction of the fourth magnetic column 115 is parallel or substantially parallel to the x direction, a T-shaped magnetic core as shown in FIG. 6 may be provided.

Referring to FIG. 6, when the first terminal 114a of the third magnetic column 114 is connected with the fourth magnetic column 115, the magnetic flux Φ from the first magnetic column 112 flows to the third magnetic column 114 and the fourth magnetic column 115 via the cross section B and the cross section C, respectively, and a portion of the magnetic flux Φ may also flow to the first terminal 114a of the third magnetic column 114 that is connected with the fourth magnetic column 115, so that the area of the cross section C may be further reduced, and accordingly the height h' of the base plate 111 may be further reduced.

Figure 9:
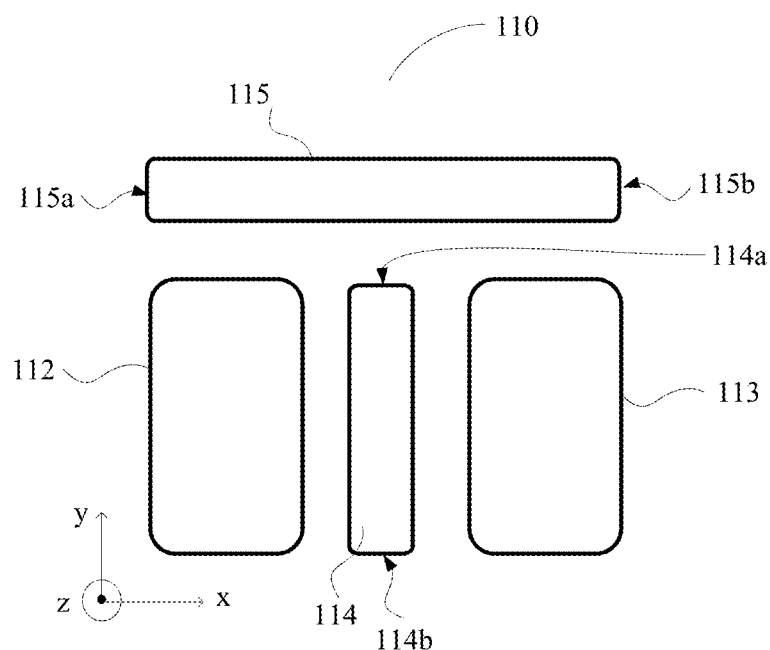
FIG. 9 schematically illustrates a detailed structure of an IM device according to a preferred embodiment of the present invention which is an variation of FIG. 4.

In a variation of the preferred embodiment of FIG. 4, referring to FIG. 9, the fourth magnetic column 115 and the first terminal 114a of the third magnetic column 114 may be disconnected, that is, a gap exists between the fourth magnetic column 115 and the first terminal 114a of the third magnetic column 114, which may also shunt the magnetic flux. For the sake of simplicity, the base plate is not shown in FIG. 9.

Figure 10:
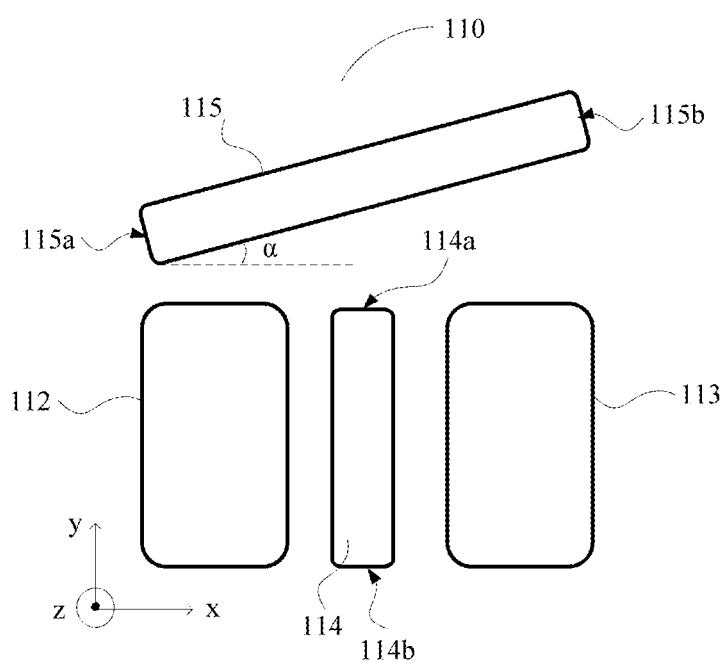
FIG. 10 schematically illustrates a detailed structure of an IM device according to a preferred embodiment of the present invention which is an variation of FIG. 4.

In another variation of the preferred embodiment of FIG. 4, referring to FIG. 10, the extension direction of the fourth magnetic column 115 and the length direction (i.e., the x direction) are oriented at a non-zero angle α, which may also shunt the magnetic flux. For the sake of simplicity, the based plate is not shown in FIG. 10. In this case, the second portion of the base plate 111 is a portion of the base plate 111 that is disposed below the first magnetic column 112 and overlaps, in the x direction, with a projection of the fourth magnetic column 115 in the x direction.

In another variation of the preferred embodiment of FIG. 4, the two terminals of the fourth magnetic column 115 in the x direction may not be flush with a side of the first magnetic column 112 away from the third magnetic column 114 and a side of the second magnetic column 113 away from the third magnetic column 114.

Figure 11:
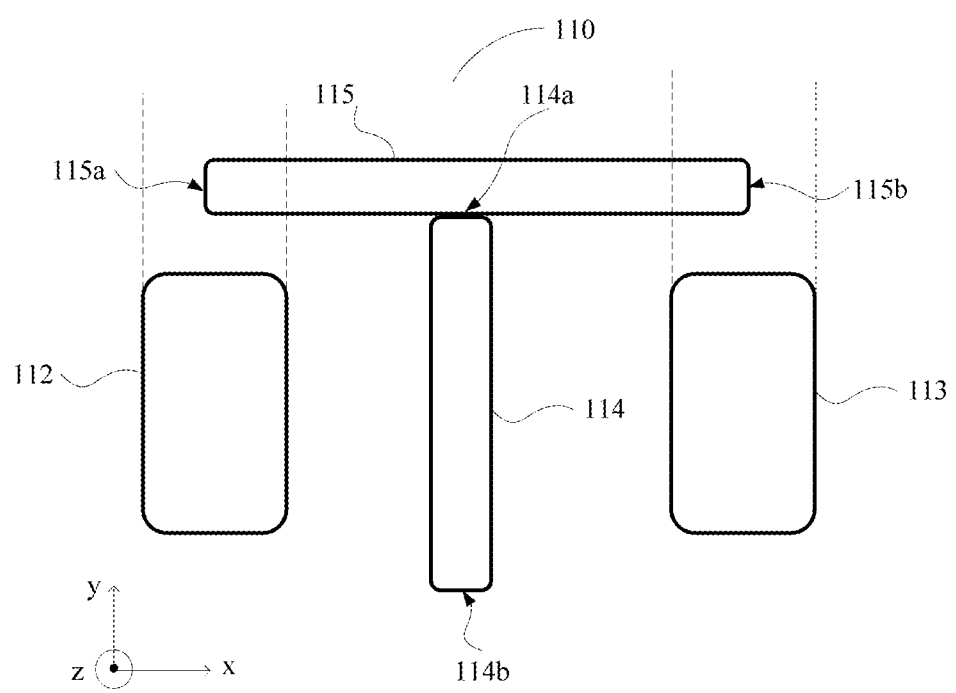
FIG. 11 schematically illustrates a detailed structure of an IM device according to a preferred embodiment of the present invention which is an variation of FIG. 4.

For example, referring to FIG. 11, in the x direction, the first terminal 115a of the fourth magnetic column 115 may be disposed between a side of the first magnetic column 112 close to the third magnetic column 114 and a side of the first magnetic column 112 away from the third magnetic column 114. Similarly, the second terminal 115b of the fourth magnetic column 115 may be disposed between a side of the second magnetic column 113 close to the third magnetic column 114 and a side of the second magnetic column 113 away from the third magnetic column 114. For the sake of simplicity, the base plate is not shown in FIG. 11.

Figure 12:
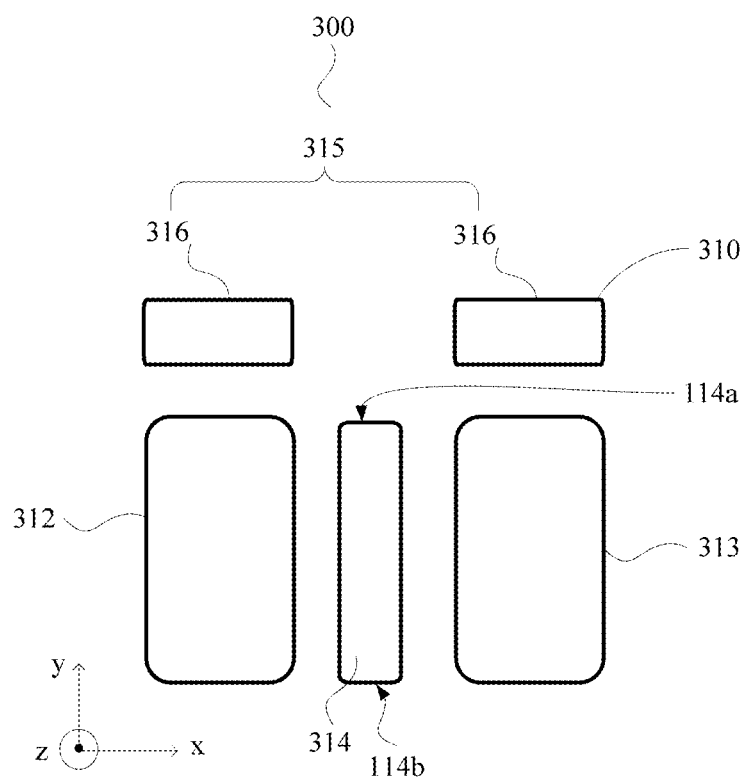
FIG. 12 schematically illustrates a detailed structure of an IM device according to a preferred embodiment of the present invention.

FIG. 12 schematically illustrates a detailed structure of an IM device 300 according to a preferred embodiment. Differences between the IM device 300 and the IM device 100 are described below.

Referring to FIG. 12, the IM device 300 includes a magnetic core 310, a first coil (not shown), and a second coil (not shown).

FIG. 12 merely shows a first magnetic column 312, a second magnetic column 313, a third magnetic column 314, and a fourth magnetic column 315 included in the magnetic core 310, and an arrangement of the four magnetic columns. For the sake of simplicity, a base plate is not shown in FIG. 12.

A winding configuration of the first coil on the first magnetic column 312 and a winding configuration of the second coil on the second magnetic column 313 are the same as or similar to those in the above preferred embodiment, and are not described in detail here.

In the present preferred embodiment, a main difference from the above preferred embodiment is that the fourth magnetic column 315 includes a plurality of segments of columns 316, and adjacent segments of columns 316 are spaced apart by a gap in the length direction (i.e., the x direction).

For example, referring to FIG. 12, the fourth magnetic column 315 includes two segments of columns 316, and the two segments of columns 316 completely overlap with the first magnetic column 312 and the second magnetic column 313 respectively along the x direction. The length of the segment of column 316 in the x direction may preferably be equal or substantially equal to the length of the first magnetic column 312 or the length of the second magnetic column 313 in the x direction.

Further, in the x direction, the plurality of segments of columns 316 may be arranged in a straight line, and an extension direction of each segment of column 316 is preferably parallel or substantially parallel to the x direction.

In a variation of the preferred embodiment of FIG. 12, for one or more segments of the columns 316 included in the fourth magnetic column 315, the length of the segments of the columns 316 in the x direction may be less than the length of the first magnetic column 312 or the length of the second magnetic column 313 in the x direction. In this case, although an area of the cross section C is correspondingly reduced, the magnetic flux can still be shunted to reduce the height h'.

In another variation of the preferred embodiment of FIG. 12, the plurality of segments of columns 316 included in the fourth magnetic column 315 may be arranged end-to-end along the x direction, so as to obtain a cross section C as large as possible.

Figure 13:
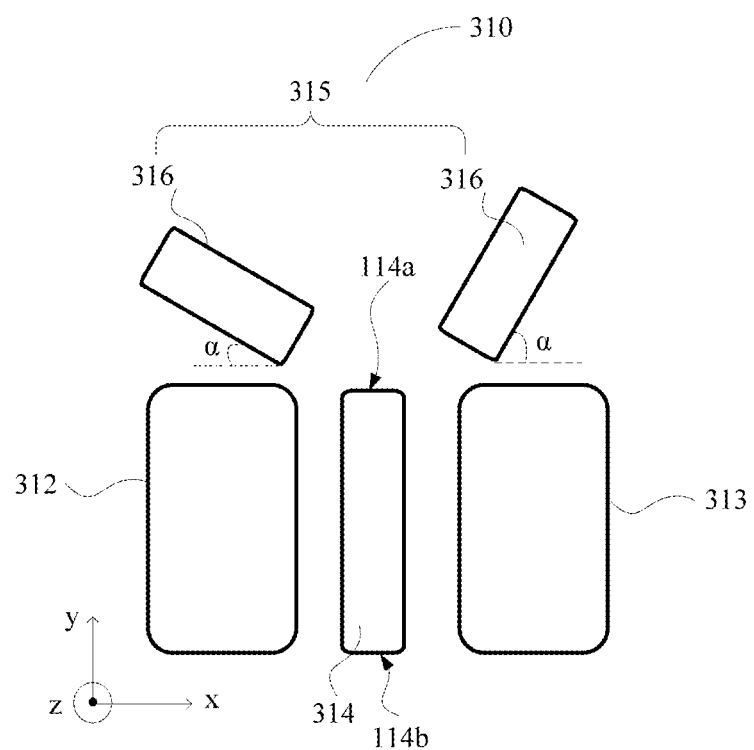
FIG. 13 schematically illustrates a detailed structure of an IM device according to a preferred embodiment of the present invention which is a variation of FIG. 12.
Figure 14:
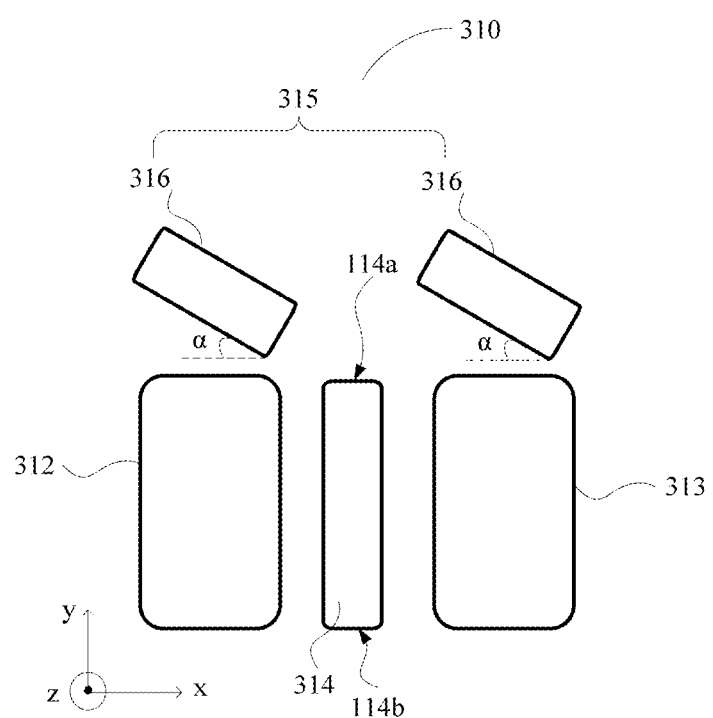
FIG. 14 schematically illustrates a detailed structure of an IM device according to a preferred embodiment of the present invention which is a variation of FIG. 12.

In another variation of the preferred embodiment of FIG. 12, referring to FIGS. 13 and 14, an angle α between the extension direction of each segment of column 316 and the length direction (i.e., the x direction) may not be zero. For the sake of simplicity, the base plate is not shown in FIGS. 13 and 14.

For example, referring to FIG. 13, the angle α between the extension direction of each segment of the columns 316 and the x direction may be different.

For another example, referring to FIG. 14, the angle α between the extension direction of each segment of the columns 316 and the x direction may be the same.

In another variation of the preferred embodiment of FIG. 12, the first terminal 114a of the third magnetic column 314 may extend along the y direction as shown in the figures, such as between two segments of the columns 316 of the fourth magnetic column 315, to further increase the area of the cross section through which the magnetic flux flows.

Figure 15:
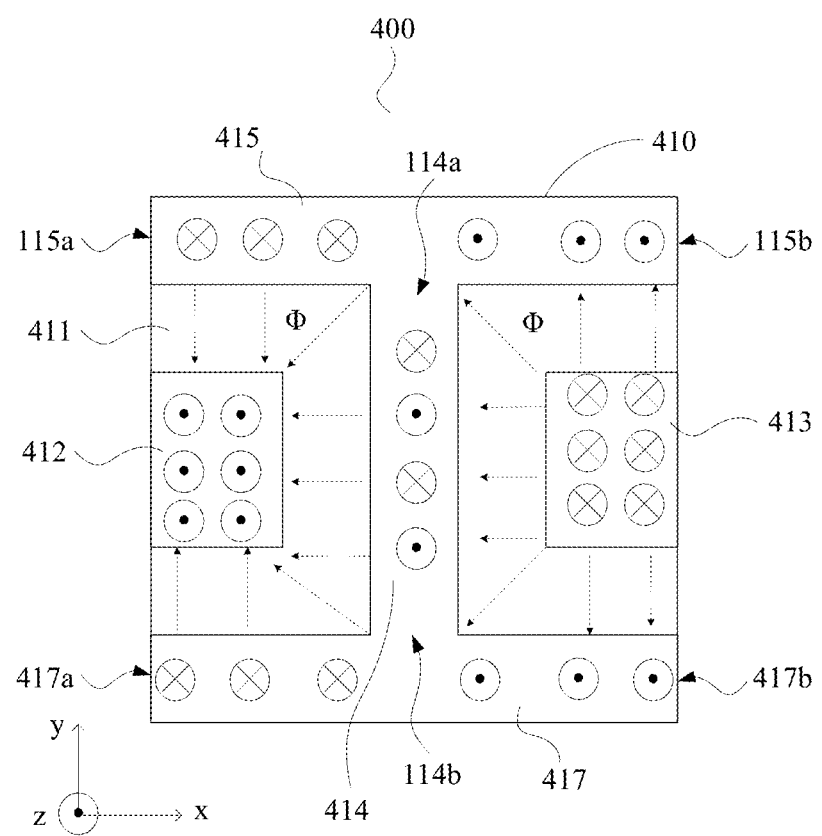
FIG. 15 schematically illustrates a detailed structure of an IM device according to a preferred embodiment of the present invention.

FIG. 15 schematically illustrates a detailed structure of an IM device 400 according to a preferred embodiment of the present invention. Differences between the IM device 400 and the IM device 100 are described below.

Referring to FIG. 15, the IM device 400 includes a magnetic core 410, a first coil (not shown), and a second coil (not shown).

FIG. 15 merely shows a first magnetic column 412, a second magnetic column 413, a third magnetic column 414, and a fourth magnetic column 415 included in the magnetic core 410, and an arrangement of the four magnetic columns on a base plate 411. Further, FIG. 15 also shows an example of the flow of the magnetic flux Φ in the IM device 400.

A winding configuration of the first coil on the first magnetic column 412 and a winding configuration of the second coil on the second magnetic column 413 are the same as or similar to those in the above preferred embodiments as shown in FIG. 4, and are not described in detail here.

In the present preferred embodiment, a main difference from the above preferred embodiment as shown in FIG. 4 is that the magnetic core 410 further includes a fifth magnetic column 417. The fifth magnetic column 417 is disposed between the base plate 411 and the cover plate (not shown), and close to a second terminal 114b of the third magnetic column 414 in the width direction (i.e., the y direction), where the second terminal 114b is opposite to the first terminal 114a. In the length direction (i.e., the x direction), the fifth magnetic column 417 overlaps with at least a portion of the first magnetic column 412 and at least a portion of the second magnetic column 413.

In the present preferred embodiment, the fourth magnetic column 415 and the fifth magnetic column 417 are provided to shunt a portion of the magnetic flux Φ flowing from the first magnetic column 412 and the second magnetic column 413. When a sum of an area of the cross section B and an area of the cross section C is not smaller than a minimum magnetic flux area, it is ensured that the IM device 400 does not reach magnetic saturation, so that it is possible to reduce the height h' of the base plate 411 in the z direction. In other words, in the present preferred embodiment, the fourth magnetic column 415 and the fifth magnetic column 417 are provided to define the cross section C through which the magnetic flux Φ passes, and the area of the cross section C may compensate for a reduction in the area of the cross section B caused by the decrease in height h'.

Further, the sum of the area of the cross section B and the area of the cross section C is preferably smaller than the area of the cross section A.

Further, in the x direction, the two terminals of the fourth magnetic column 415 (i.e., the first terminal 115a and the second terminal 115b) are preferably flush with a side of the first magnetic column 412 away from the third magnetic column 414, and a side of the second magnetic column 413 away from the third magnetic column 414, respectively. Similarly, the two terminals of the fifth magnetic column 417 (i.e., the first terminal 417a and the second terminal 417b) are preferably flush with the side of the first magnetic column 412 away from the third magnetic column 414, and the side of the second magnetic column 413 away from the third magnetic column 414, respectively. In other words, in the x direction, the length of the fourth magnetic column 415 and the length of the fifth magnetic column 417 may preferably be the same or substantially the same.

Further, an extension direction of the fourth magnetic column 415 and an extension direction of the fifth magnetic column 417 may preferably be parallel or substantially parallel to the x direction.

Further, the fourth magnetic column 415 is connected to or abuts the first terminal 114a of the third magnetic column 414, and the fifth magnetic column 417 is connected to or abuts the second terminal 114b of the third magnetic column 414.

Further, in the y direction, a gap preferably exists between the fifth magnetic column 417 and the first magnetic column 412, and between the fifth magnetic column 417 and the second magnetic column 413.

In a variation of the preferred embodiment of FIG. 15, both terminals of at least one of the fourth magnetic column 415 and the fifth magnetic column 417 may not be flush with the side of the first magnetic column 412 away from the third magnetic column 414, and the side of the second magnetic column 413 away from the third magnetic column 414.

Figure 16:
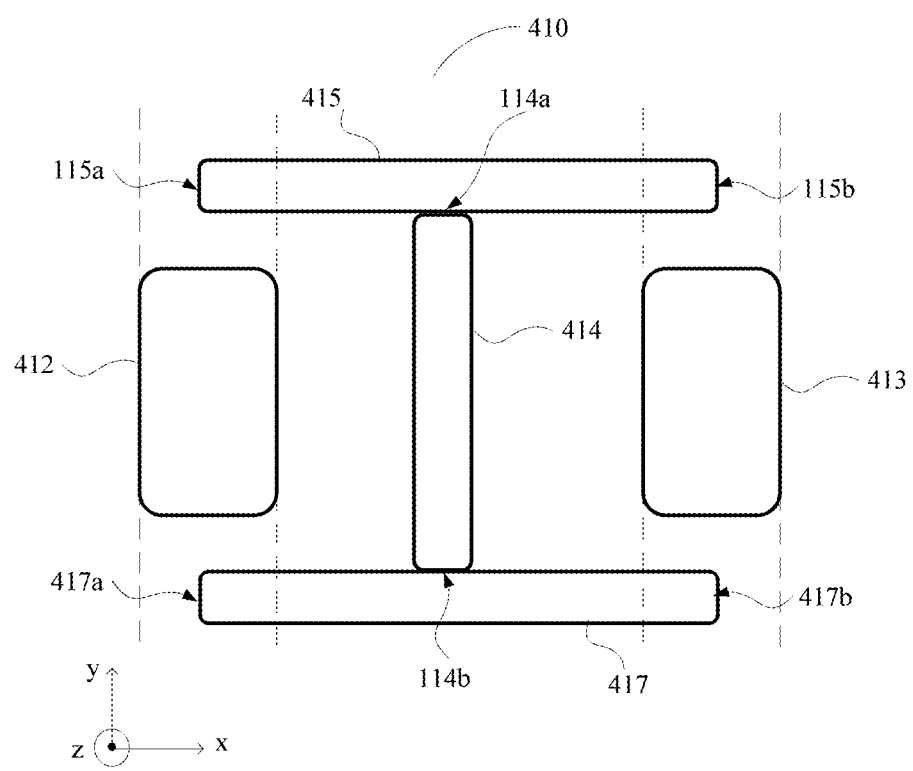
FIG. 16 schematically illustrates a detailed structure of an IM device according to a preferred embodiment of the present invention which is a variation of FIG. 15.

For example, referring to FIG. 16, the fourth magnetic column 415 includes opposite first and second terminals 115a and 115b in the x direction. The first terminal 115a is disposed between the side of the first magnetic column 412 away from the third magnetic column 414 and a side of the first magnetic column 412 close to the third magnetic column 414, and the second terminal 115b is disposed between the side of the second magnetic column 413 away from the third magnetic column 414 and a side of the second magnetic column 413 close to the third magnetic column 414. For the sake of simplicity, the base plate is not shown in FIG. 16.

Similarly, the fifth magnetic column 417 includes opposite first and second terminals 417a and 417b in the x direction. The first terminal 417a is disposed between the side of the first magnetic column 412 away from the third magnetic column 414 and the side of the first magnetic column 412 close to the third magnetic column 414, and the second terminal 417b is disposed between the side of the second magnetic column 413 away from the third magnetic column 414 and the side of the second magnetic column 413 close to the third magnetic column 414.

Further, the length of the fourth magnetic column 415 in the x direction and the length of the fifth magnetic column 417 in the x direction may be the same or different.

Further, in the x direction, an overlapping area of the fourth magnetic column 415 and the first magnetic column 412 and an overlapping area of the fifth magnetic column 417 and the first magnetic column 412 may be the same or different.

Similarly, in the x direction, an overlapping area of the fourth magnetic column 415 and the second magnetic column 413 and an overlapping area of the fifth magnetic column 417 and the second magnetic column 413 may be the same or different.

In another variation of the preferred embodiment of FIG. 15, at least one of the extension directions of the fourth magnetic column 415 and the fifth magnetic column 417 is oriented at a non-zero angle α with respect to the x direction.

Figure 17:
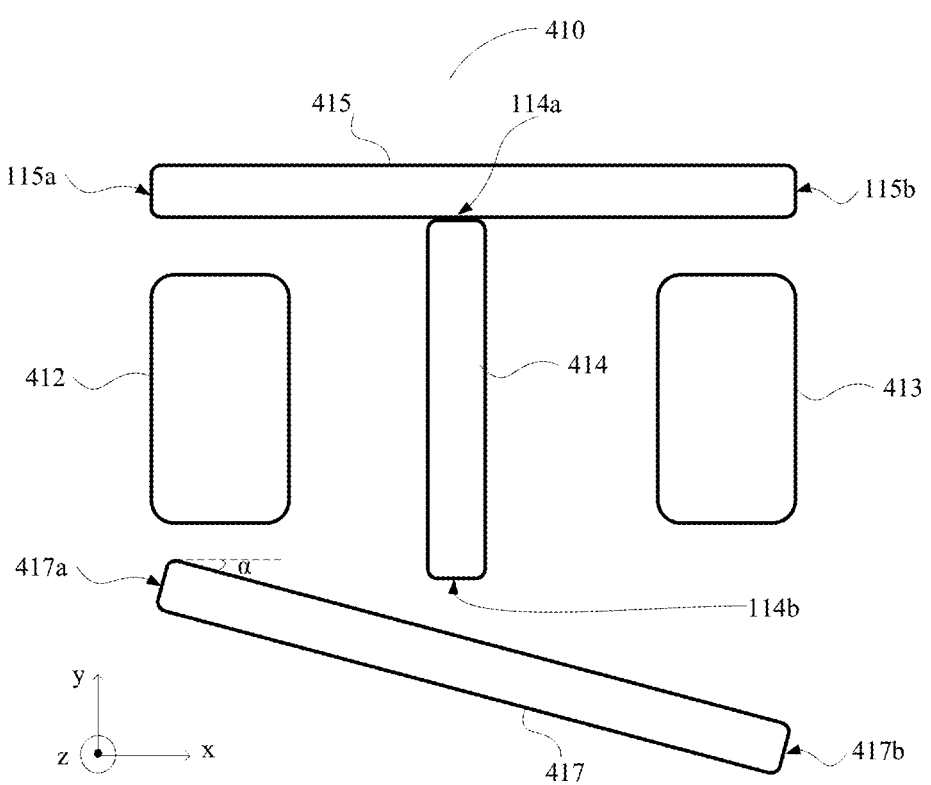
FIG. 17 schematically illustrates a detailed structure of an IM device according to a preferred embodiment of the present invention which is a variation of FIG. 16.

For example, referring to FIG. 17, the extension direction of the fourth magnetic column 415 may be parallel or substantially parallel to the x direction, and the extension direction of the fifth magnetic column 417 and the x direction may be oriented at a non-zero angle α; and vice versa. For the sake of simplicity, the base plate is not shown in FIG. 17.

Alternatively, both the extension directions of the fourth magnetic column 415 and the fifth magnetic column 417 may be oriented at a non-zero angle α with respect to the x direction, and the angles α between the extension directions of the two magnetic columns and the x direction may be the same or different.

Further, when the extension direction of the fourth magnetic column 415 or the fifth magnetic column 417 and the x direction is oriented at a non-zero angle α, the terminals of the fourth magnetic column 415 and the fifth magnetic column 417 along the x direction may be flush or not flush with the side of the first magnetic column 412 away from the third magnetic column 414 and the side of the second magnetic column 413 away from the third magnetic column 414.

In another variation of the preferred embodiment of FIG. 15, in the y direction, a gap may exist between the fourth magnetic column 415 and the first terminal 114a of the third magnetic column 414, and/or a gap may exist between the fifth magnetic column 417 and the second terminal 114b of the third magnetic column 414.

In another variation of the preferred embodiment of FIG. 15, the fifth magnetic column 417 may include a plurality of segments, and adjacent segments may be spaced apart with a gap therebetween in the length direction (i.e., the x direction).

Further, the fourth magnetic column 415 may also include a plurality of segments, and adjacent segments may be spaced apart with a gap therebetween in the length direction (i.e., the x direction).

Figure 18:
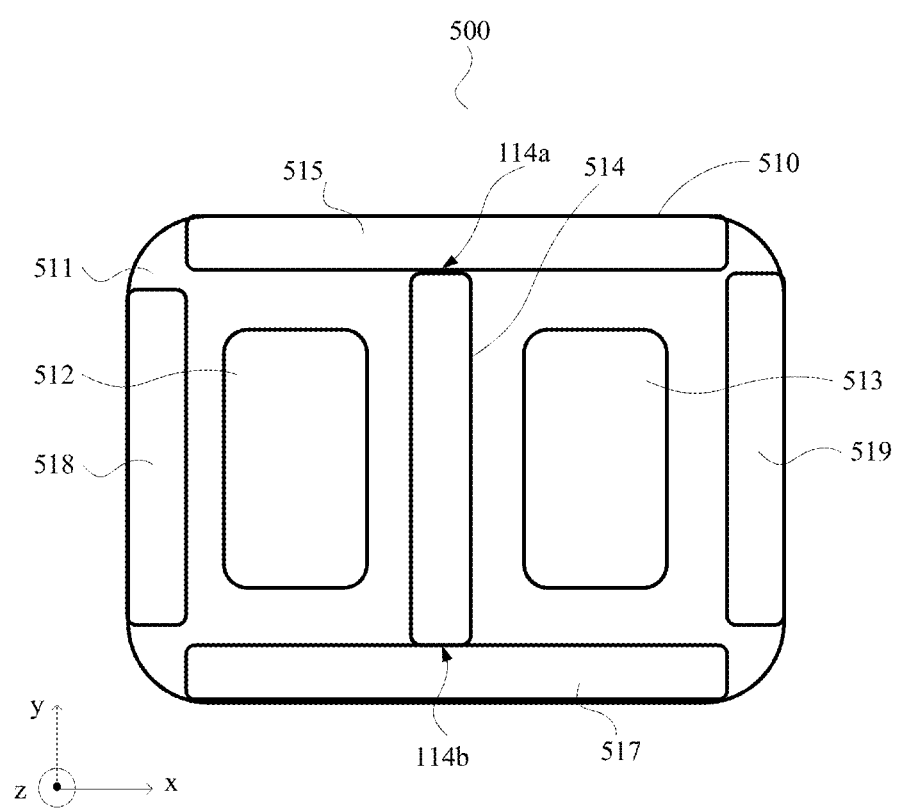
FIG. 18 schematically illustrates a detailed structure of an IM device according to a preferred embodiment of the present invention.

FIG. 18 schematically illustrates a detailed structure of an IM device 500 according to a preferred embodiment of the present invention. Differences between the IM device 500 and the IM device 100 are described below.

Referring to FIG. 18, the IM device 500 includes a magnetic core 510, a first coil (not shown), and a second coil (not shown).

FIG. 18 merely shows a first magnetic column 512, a second magnetic column 513, a third magnetic column 514, and a fourth magnetic column 515 included in the magnetic core 510, and an arrangement of the four magnetic columns on a base plate 511.

A winding configuration of the first coil on the first magnetic column 512 and a winding configuration of the second coil on the second magnetic column 513 are the same as or similar to those in the above preferred embodiment as shown in FIG. 4, and are not described in detail here.

In the present preferred embodiment, a main difference from the above preferred embodiment as shown in FIG. 4 is in that the magnetic core 510 further includes a fifth magnetic column 517 disposed between the base plate 511 and the cover plate (not shown), and close to the second terminal 114b of the third magnetic column 514 in the width direction (i.e., the y direction), and in the length direction (i.e., the x direction), the fifth magnetic column 517 overlaps with at least a portion of the first magnetic column 512 and at least a portion of the second magnetic column 513, wherein the second terminal 114b of the third magnetic column 514 is opposite to the first terminal 114a of the third magnetic column 514, a sixth magnetic column 518 disposed between the base plate 511 and the cover plate, on a plane formed by the length direction (i.e., the x direction) and the width direction (i.e., the y direction), the sixth magnetic column 518 is disposed at one side of the first magnetic column 512 away from the third magnetic column 514, and in the width direction (i.e., the y direction), the length of the sixth magnetic column 518 is not less than the length of the first magnetic column 512, and a seventh magnetic column 519 disposed between the base plate 511 and the cover plate, on the plane formed by the length direction (i.e., the x direction) and the width direction (i.e., the y direction), the seventh magnetic column 519 is disposed at one side of the second magnetic column 519 away from the third magnetic column 514, and in the width direction (i.e., the y direction), the length of the seventh magnetic column 519 is not less than the length of the second magnetic column 513.

Specifically, the magnetic flux Φ flowing from the first magnetic column 512 may be divided into four portions which respectively flow through the fourth magnetic column 515, the fifth magnetic column 517, the sixth magnetic column 518, and the seventh magnetic column 519, respectively, and then return to the first magnetic column 512.

In the present preferred embodiment, the fourth magnetic column 515, the fifth magnetic column 517, the sixth magnetic column 518, and the seventh magnetic column 519 are provided to shunt a portion of the magnetic flux Φ flowing from the first magnetic column 512 and the second magnetic column 513. When a sum of areas of the two cross sections B and the two cross sections C is not less than the minimum magnetic flux area, it is ensured that the IM device 500 does not reach magnetic saturation, which makes it possible to reduce the height h' of the base plate 511 in the z direction. In other words, the fourth magnetic column 515, the fifth magnetic column 517, the sixth magnetic column 518, and the seventh magnetic column 519 are provided to define two cross sections C and two cross sections B through which the magnetic flux Φ passes, and the areas of the added cross sections may compensate for a reduction in the area of the one cross section B caused by the decrease in height h'.

Further, the sum of the areas of the two cross sections B and the two cross sections C is preferably smaller than the area of the cross section A.

Further, in the present preferred embodiment, the sixth magnetic column 518 and/or the seventh magnetic column 519 may be a single-segment column. Alternatively, the sixth magnetic column 518 and/or the seventh magnetic column 519 may include a plurality of segments of columns, and adjacent segments of columns may be spaced apart with a gap therebetween in the y direction.

Further, in the x direction, a gap may exist between the sixth magnetic column 518 and a side of the first magnetic column 512 away from the third magnetic column 514, and a gap may exist between the seventh magnetic column 519 and a side of the second magnetic column 513 away from the third magnetic column 514.

Further, an extension direction of the sixth magnetic column 518 may be parallel or substantially parallel to the y direction, and/or an extension direction of the seventh magnetic column 519 may be parallel or substantially parallel to the y direction.

Figure 19:
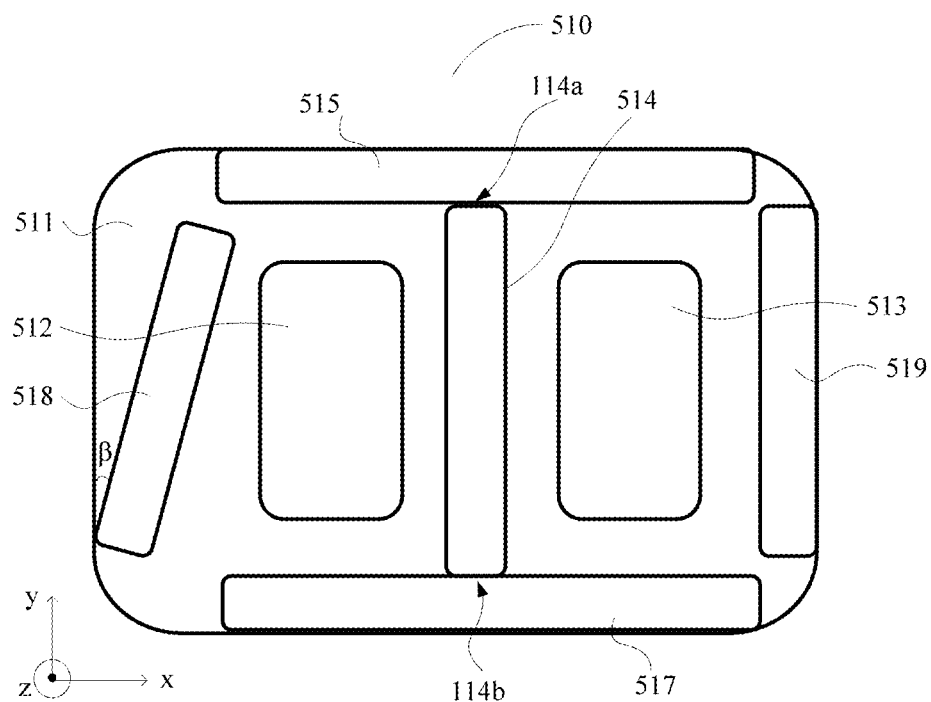
FIG. 19 schematically illustrates a detailed structure of an IM device according to a preferred embodiment of the present invention which is a variation of FIG. 18.

In a variation of the preferred embodiment of FIG. 18, referring to FIG. 19, the extension direction of the sixth magnetic column 518 and/or the seventh magnetic column 519 may be oriented at a non-zero angle β with respect to the y direction.

Further, when the extension directions of the sixth magnetic column 518 and the seventh magnetic column 519 are oriented at a non-zero angle β with respect to the y direction, the angle β between the two magnetic columns and the y direction may be the same or different.

In another variation of the preferred embodiment of FIG. 18, the sixth magnetic column 518 and/or the seventh magnetic column 519 may include a plurality of segments of columns, and adjacent segments of columns are spaced paragraph with a gap therebetween in the y direction.

Figure 20:
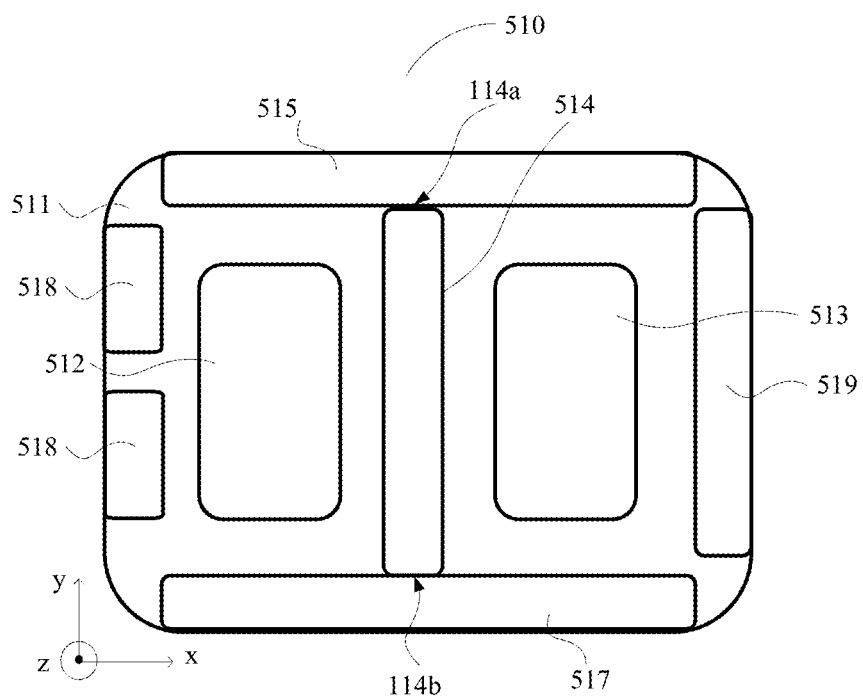
FIG. 20 schematically illustrates a detailed structure of an IM device according to a preferred embodiment of the present invention which is a variation of FIG. 18.

For example, referring to FIG. 20, the sixth magnetic column 518 may include two segments of columns, and the seventh magnetic column 519 may be a single-segment column.

Figure 21:
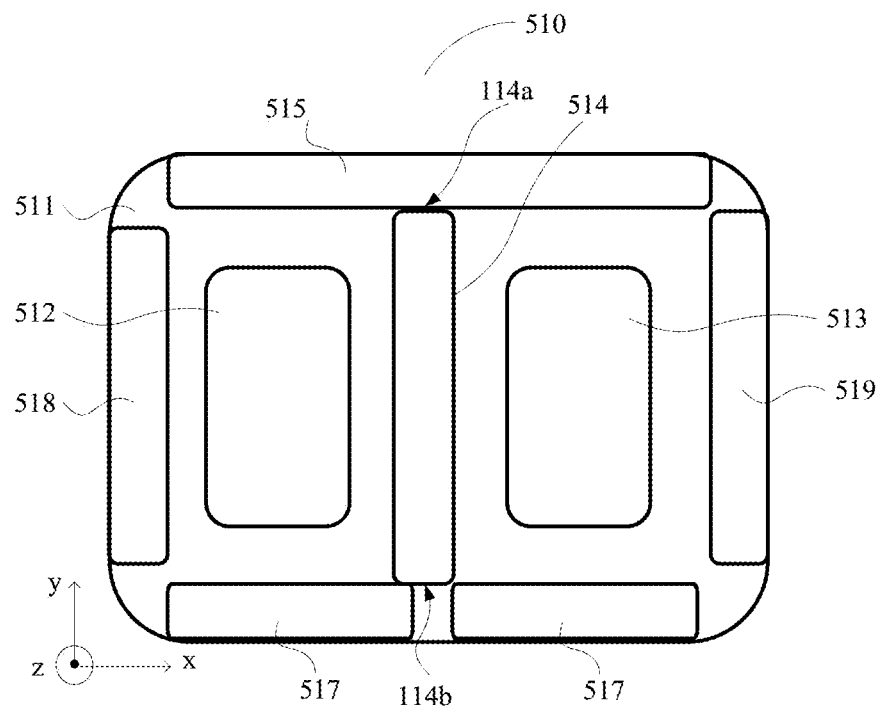
FIG. 21 schematically illustrates a detailed structure of an IM device according to a preferred embodiment of the present invention which is a variation of FIG. 18.

In a variation of the preferred embodiment of FIG. 18, referring to FIG. 21, the fifth magnetic column 517 may include a plurality of segments of columns, and adjacent segments of columns are spaced apart with a gap therebetween in the length direction (i.e., the x direction).

Further, the fourth magnetic column 515 may include a plurality of segments of columns, and adjacent columns are spaced apart with a gap therebetween in the length direction (i.e., the x direction).

Figure 22:
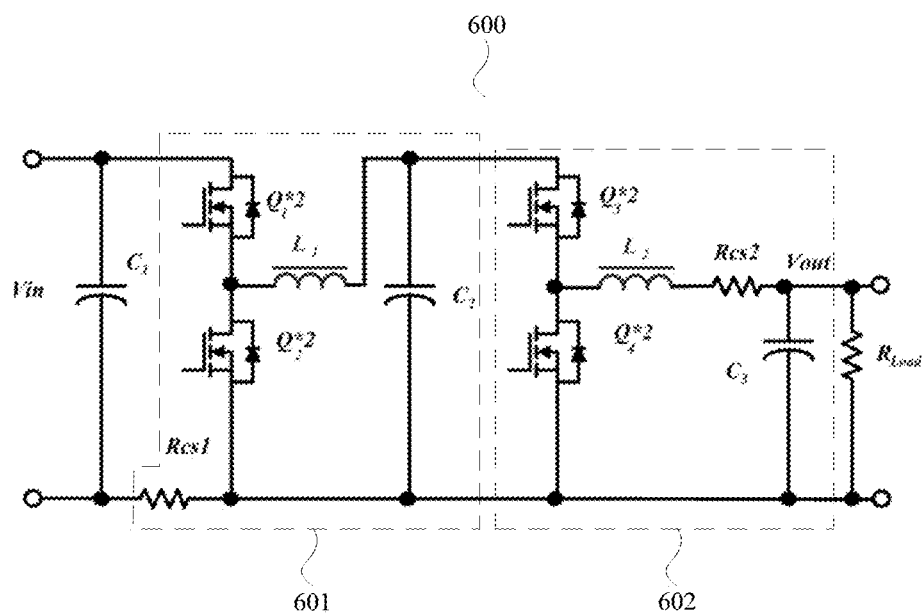
FIG. 22 schematically illustrates a circuit diagram in an application scenario according to a preferred embodiment of the present invention.

In a typical application scenario, referring to FIG. 22, any of the IM devices 100, 300, 400 and 500 described in the above preferred embodiments may be applied to a dual buck circuit 600 as shown in FIG. 22.

Specifically, the dual buck circuit 600 may include a first buck module 601 and a second buck module 602, where the first buck module 601 includes the first inductor L1 in the IM device 100, 300, 400 or 500 as described in the above preferred embodiments, and the second buck module 602 includes the second inductor L2 in the IM device 100, 300, 400 or 500.

In some preferred embodiments, the first buck module 601 and the second buck module 602 may be two independent buck modules connected in parallel, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An integrated magnetic (IM) device, comprising:
a magnetic core including a base plate, a cover plate, and a first magnetic column, a second magnetic column, and a third magnetic column disposed between the base plate and the cover plate, the magnetic core having a length direction, a width direction and a height direction which are perpendicular or substantially perpendicular to each other, a straight line defined by positions of the first magnetic column and the second magnetic column being parallel or substantially parallel to the length direction, and the third magnetic column being disposed between the first magnetic column and the second magnetic column, and extending in the width direction;
a first coil wound around the first magnetic column to generate a closed magnetic flux loop;
a second coil wound around the second magnetic column to generate a closed magnetic flux loop; wherein
the magnetic core further includes a fourth magnetic column;
the fourth magnetic column is disposed between the base plate and the cover plate, and proximate to a first terminal of the third magnetic column in the width direction; and
in the length direction, the fourth magnetic column overlaps with at least a portion of the first magnetic column and at least a portion of the second magnetic column.

2. The IM device according to claim 1, wherein the fourth magnetic column includes a plurality of column segments, and a gap exists between adjacent column segments of the plurality of column segments in the length direction.

3. The IM device according to claim 2, wherein an extension direction of the fourth magnetic column is parallel or substantially parallel to the length direction.

4. The IM device according to claim 2, wherein an extension direction of the fourth magnetic column is oriented at a non-zero angle with respect to the length direction.

5. The IM device according to claim 1, wherein the fourth magnetic column is a single-segment column.

6. The IM device according to claim 5, wherein an extension direction of the fourth magnetic column is parallel or substantially parallel to the length direction.

7. The IM device according to claim 5, wherein an extension direction of the fourth magnetic column is oriented at a non-zero angle with respect to the length direction.

8. The IM device according to claim 1, wherein in the width direction, a gap exists between the fourth magnetic column and the first magnetic column, and a gap exists between the fourth magnetic column and the second magnetic column.

9. The IM device according to claim 8, wherein an extension direction of the fourth magnetic column is parallel or substantially parallel to the length direction.

10. The IM device according to claim 8, wherein an extension direction of the fourth magnetic column is oriented at a non-zero angle with respect to the length direction.

11. The IM device according to claim 1, wherein
the magnetic core further includes a fifth magnetic column;
the fifth magnetic column is disposed between the base plate and the cover plate, and proximate to a second terminal of the third magnetic column in the width direction;
in the length direction, the fifth magnetic column overlaps with at least a portion of the first magnetic column and at least a portion of the second magnetic column; and
the second terminal of the third magnetic column is opposite to the first terminal of the third magnetic column.

12. The IM device according to claim 11, wherein the fifth magnetic column includes a plurality of column segments, and a gap exists between adjacent column segments of the plurality of column segments in the length direction.

13. The IM device according to claim 11, wherein the fifth magnetic column is a single-segment column.

14. The IM device according to claim 11, wherein an extension direction of the fourth magnetic column is parallel or substantially parallel to the length direction.

15. The IM device according to claim 11, wherein an extension direction of the fourth magnetic column is oriented at a non-zero angle with respect to the length direction.

16. The IM device according to claim 1, wherein the magnetic core includes:
a fifth magnetic column located between the base plate and the cover plate and proximate to a second terminal of the third magnetic column in the width direction, and in the length direction, the fifth magnetic column overlaps with at least a portion of the first magnetic column and at least a portion of the second magnetic column, the second terminal of the third magnetic column being opposite to the first terminal of the third magnetic column;
a sixth magnetic column located between the base plate and the cover plate and on a plane defined by the length direction and the width direction, the sixth magnetic column is disposed at one side of the first magnetic column away from the third magnetic column, and in the width direction, a length of the sixth magnetic column is not less than a length of the first magnetic column; and a seventh magnetic column located between the base plate and the cover plate and on the plane defined by the length direction and the width direction, the seventh magnetic column is disposed at one side of the second magnetic column away from the third magnetic column, and in the width direction, a length of the seventh magnetic column is not less than a length of the second magnetic column.

17. The IM device according to claim 16, wherein the fifth magnetic column includes a plurality of column segments, and a gap exists between adjacent segments in the length direction.

18. The IM device according to claim 16, wherein the fifth magnetic column is a single-segment column.

19. The IM device according to claim 1, wherein an extension direction of the fourth magnetic column is parallel or substantially parallel to the length direction.

20. The IM device according to claim 1, wherein an extension direction of the fourth magnetic column is oriented at a non-zero angle with respect to the length direction.

\* \* \* \* \*